United States Patent Office 3,512,083
Patented May 12, 1970

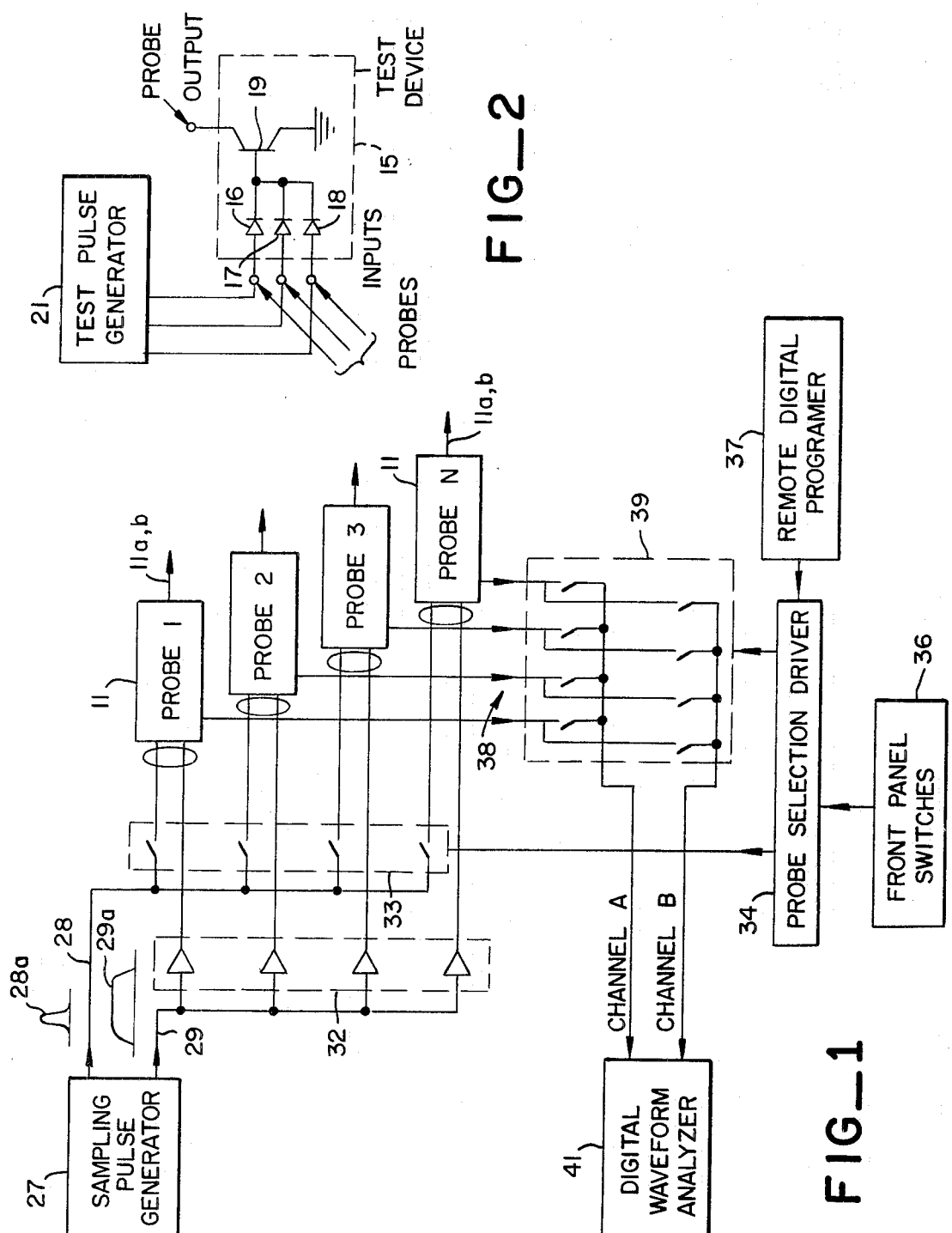

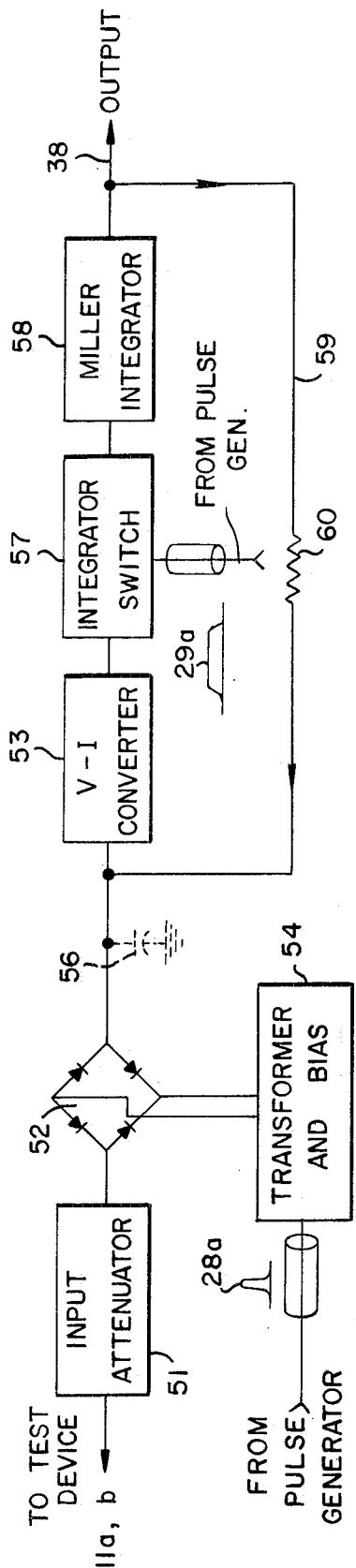
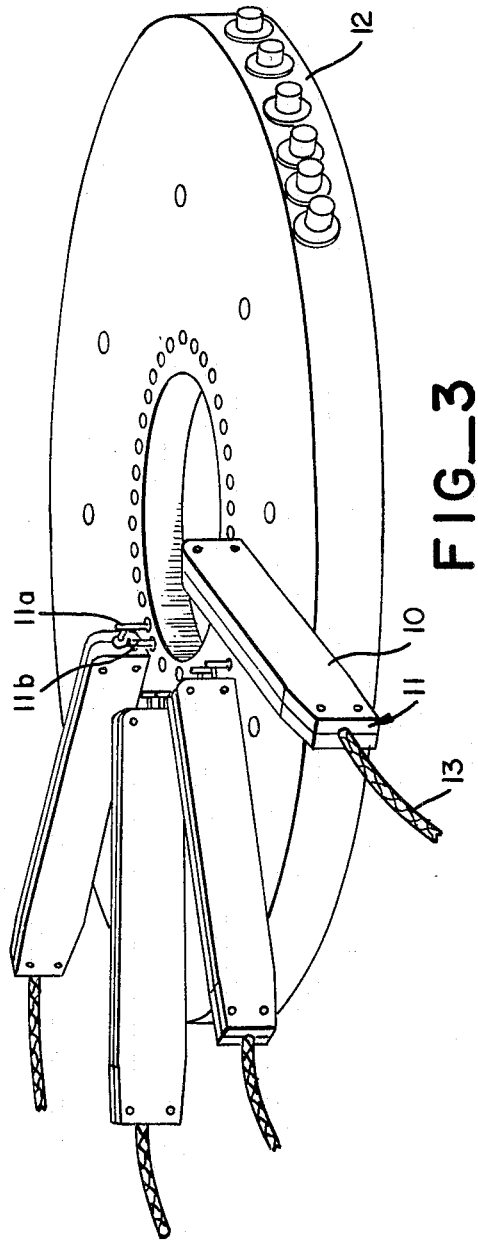
FIG_4
FIG_3
INVENTORS
SAMUEL R. McCUTCHEON
WILLIAM F. BOGGS
WILLIAM H. EWIN
BY
ATTORNEYS

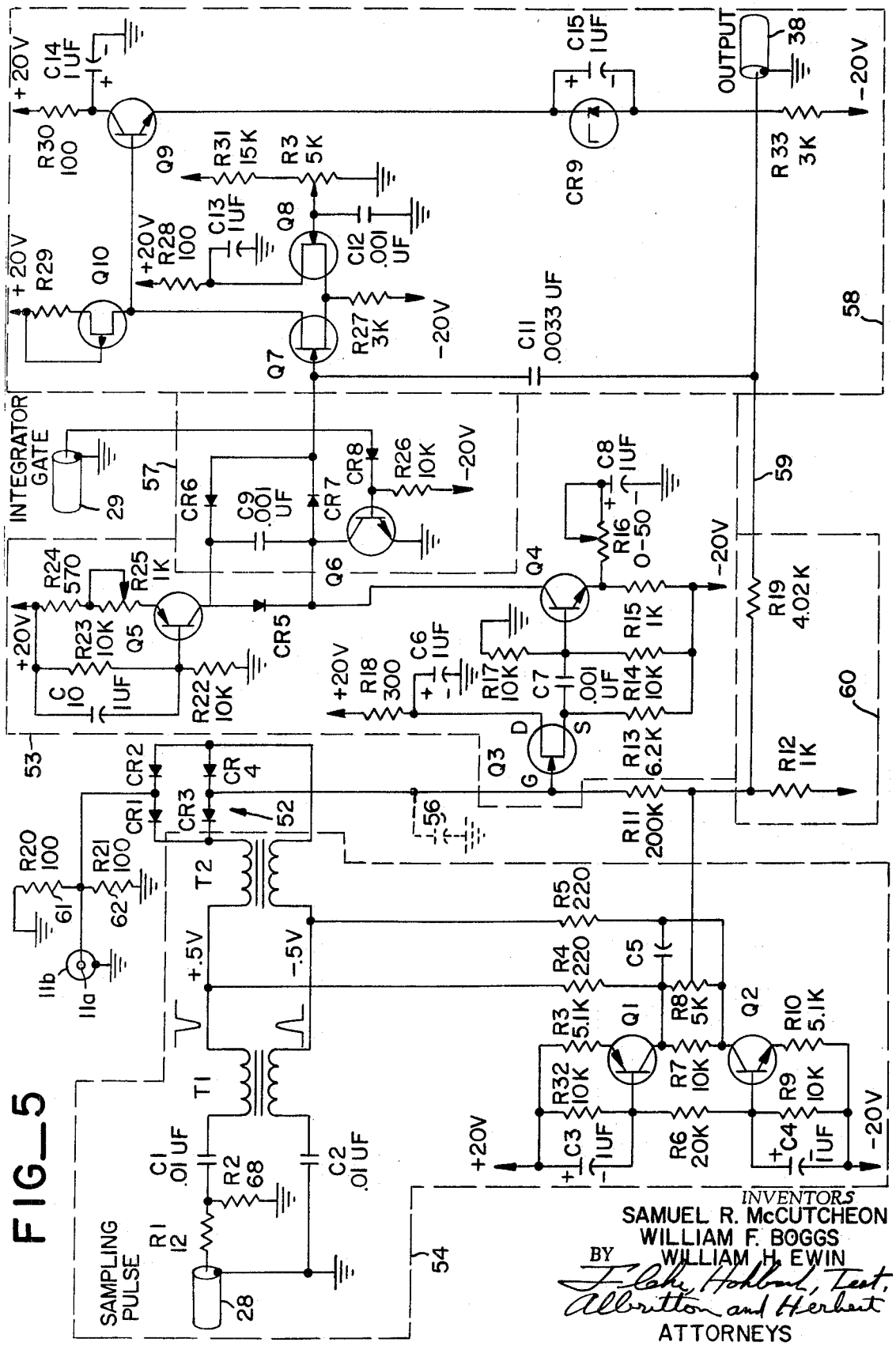

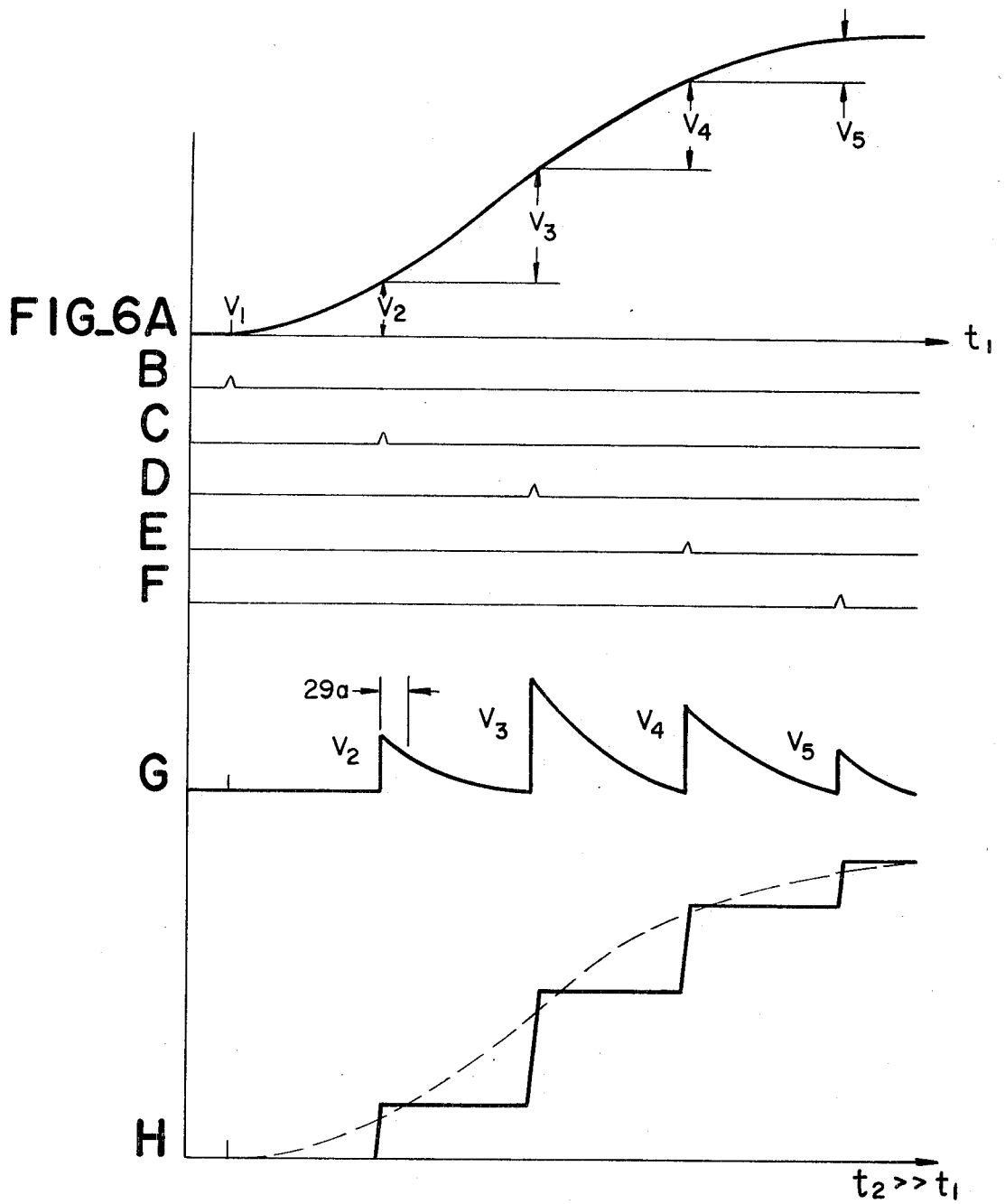

3,512,083
SAMPLING SYSTEM AND APPARATUS FOR TESTING ELECTRONIC DEVICES USING A PLURALITY OF SELF-CONTAINED PROBES
Samuel R. McCutcheon, Saratoga, William F. Boggs, Fremont, and William E. Ewin, Los Altos, Calif., assignors to Automated Measurements Corporation, Los Gatos, Calif., a corporation of California
Filed Dec. 12, 1966, Ser. No. 600,836
Int. Cl. G01r 27/00; H03b 19/00; H03k 5/00
U.S. Cl. 324—57
6 Claims

ABSTRACT OF THE DISCLOSURE

A sampling system includes a plurality of selfcontained probes which are sequentially strobed by a relatively narrow pulse to sample test signal information from a device under test. Each probe has a single ended input for this narrow pulse to allow for rapid switching between probes and converts the sampled test signal to a format having an increased time base which is then coupled out of the probe to associated wave analyzing apparatus.

---

The present invention is directed to a sampling system and apparatus for testing electronic devices and more particularly to a sytem having test probes with a low-frequency output which is easily switched.

Sampling techniques, in which sampled high-frequency waves are reconstructed on an increased time base to form a low-frequency equivalent, are ordinarily used for observing and measuring broadband signals. This technique is especially useful in the testing of electronic components where the switching speeds of components produce and require electrical signals of relatively great bandwidth.

In the testing of multiple terminal devices, such as integrated circuits, several different test signals are generated during the testing procedure. They are sensed by probes attached to the device or its test fixture and the probes in turn are coupled to appropriate test signal analyzing devices, such as a sampling oscilloscope, by means of a switching matrix or relay tree. A major disadvantage of the test system of the above type is that the switching matrix and associated leads are required to switch the high frequency test signal sample. A deterioration in system bandwidth is caused by the parasitic circuit elements of the relay tree; namely the stray indictance and capacitance. Distortion is also a side effect of the parasitic circuit elements. Another defect is the limited dynamic range because of saturation effects. To partially obviate the foregoing, probes with built-in impedance conversion are used which convert the high input impedance of the probes to a low output impedance; e.g. 50 ohms. However, the required high frequency switching matrix is expensive and limited in flexibility since some deleterious parasitic effects remain.

It is therefore a general object of the invention to provide an improved sampling system and apparatus for testing electronic components which obviate the above disadvantages.

Another object of the invention is to provide a sampling system and apparatus which provides for remote sampling and reconstruction of test signals;

Another object of the invention is to provide a sampling system and apparatus which has improved bandwidth capability and is relatively inexpensive;

Another object of the invention is to provide a system of the above character which minimizes distortion and is relatively free from saturation effects thereby providing greater dynamic range.

Additional objects and features of the invention will appear in the following description in which the preferred embodiment of the invention has been set forth in detail in conjunction with accompanying drawings.

Referring to the drawings:

FIG. 1 is a block diagram of a sampling system embodying the invention;

FIG. 2 is a schematic diagram showing how a device under test is coupled to a test pulse generator and the probes of the sampling system of the present invention.

FIG. 3 is a perspective view showing how multiple probes are connected to a switching matrix which serves as a test fixture for a device under test;

FIG. 4 is a block diagram of the circuitry in a single probe;

FIG. 5 is a more detailed circuit schematic of FIG. 4; and

FIGS. 6A through 6H are waveforms useful in understanding the invention.

In general, the invention is directed to a sampling system having a plurality of self-contained probes which are coupled to an electronic device being tested. The probes themselves reconstruct the sampled test signal on an increased time base and the reconstructed signals are then coupled from the probes to an appropriate waveform analyzer.

Referring to FIG. 3, several typical probes 11 are shown attached to a test fixture through input terminals 11a and 11b. The test fixture 12 is of the type shown and disclosed in co-pending application Ser. No. 521,101, filed Jan. 17, 1966, entitled Coaxial Switch, Assembly and System with Samuel R. McCutcheon, Logan M. Belleville and William H. Ewin as inventors. The device under test is affixed to the opposite side of the test fixture (not shown) thus placing the probes 11 in very close proximity to the test fixture to minimize parasitic circuit elements. Each probe 11 is housed in a relatively small and rectangularly-shaped metal case or housing 10 and in addition to input terminals 11a and 11b includes output terminals 13 which include various circuits to be explained in detail below. As can be seen from FIG. 3, the configuration of the case or housing is such that the housing can be disposed in relatively close proximity to each other.

Probes 11 would be typically coupled to a test device 15, as for example, a NOR logic gate as illustrated in FIG. 2 which has three input terminals through diodes 16, 17 and 18 and an output terminal through transistor 19. A test pulse generator 21 is coupled to the three inputs and selectively provides input test signals to any predetermined one of them. The four probes in practice sample any two signals at once; for example, the output signal and one of the input signals. In this manner, by comparison of the input and output test signals, the operating characteristics of the test device 15 can be obtained.

The over-all sampling system shown in FIG. 1 includes a sample time controller 26 of the type disclosed in a concurrently filed application entitled Sampling System Ser. No. 600,830, assigned to the present assignee. This controls and is coupled to a sampling pulse generator 27 which generates two types of output pulses; first on line 28 a strobe sampling pulse 28a (which in the present embodiment may have a time duration of approximately 1 nanosecond), and secondly, on output line 29, an integrating switch or stretch gate pulse 29a (which may have a duration of approximately 500 nanoseconds). Sampling pulse 28a determines, by means of its pulse width, the sampling time intervals. Integrating switch or stretch pulse 29a functions to increase the time base of the sampled signal portion as will be explained in greater detail below. Integrator switch gate 29a is coupled by amplifiers 32 to probes 11. Sampling pulse 28a is selectively coupled to the probes through switches 33 which are driven by a probe selection driver 34. Switches 33 are constructed in accordance with the above copending application Ser. No. 521,101.

In operation, sampling pulse generator 27 has its line 29 (integrating switch pulse) continuously coupled to all of the probes and line 28 (sampling pulse) selectively couples only those two probes which are actively involved in the testing procedure. The probe selection driver 34 may be manually controlled such as by front panel switches 36 on the testing equipment or by a remote programer 37 such as a teleprinter or other digital storage device. The reconstructed signals from probes 11 are produced on low-frequency lines 38 which are coupled to a switching matrix 39 to a digital waveform analyzer 41. Switching matrix 39 is controlled by probe selection driver 34 in the same manner as switches 33 so that the two probes which are active at any one time are coupled into digital waveform analyzer 41 through channel A and channel B.

An over-all block diagram of the circuitry contained in each probe 11 is illustrated in FIG. 4 which includes, starting from the input end 11a 11b of the probe, an input attenuator 51. Attenuator 51 may be a fixed value or varied by external programming such as probe selection driver 34. Variation of the attenuation may be necessary when several different types of devices are to be tested in the same test run. The output attenuator 51 is coupled to a diode bridge circuit 52 which is opened and closed by sampling pulse 28a which is coupled to the bridge through a transformer and biasing circuit 54. The sampled voltage charges stray capacitance 56, coupled to the output of bridge circuit 52, which voltage is sensed by a voltage to current converter 53. The current output of the converter 53 is coupled into an integrator switch 57 which is switched by the integrator switch pulse 29a from the pulse generator (FIG. 1). The output of the integrator switch is coupled into Miller integrator 58 which is then coupled to an output line 38. Feedback of a portion of the output voltage is provided on line 59 through resistor 60 which is coupled back to the input of the voltage to current converter 53. This is for the stabilization of the loop including converter 53, switch 57, and Miller integrator 58. In addition, the feedback maintains the voltage on stray capacitance 56.

The detailed circuit schematic of each of the probes 11 is illustrated in FIG. 5 which will be discussed in conjunction with the curves of FIG. 6. The dashed blocks show the corresponding detailed circuitry as compared to the block diagrams of FIG. 4. The signal input at the upper portion of the diagram, shown as coaxial connector 11a, is terminated in a 50 ohm impedance formed by parallel connected 100 ohm resistors 61 and 62. At the option of the user this 50 ohm termination may be replaced by an input attenuator 51 having a specified value or a programmable input attenuator. The input 11a, 11b extends to the diode bridge circuit 52 which includes diodes CR1, CR2, CR3 and CR4.

Bridge 52 is strobed or closed by the sampling pulse input 28. This input is coupled through the bridge by two transformers T1 and T2 which takes the single ended pulse and produces a pair of symmetrical pulses as indicated. These pulses serve to close bridge 52. When the bridge is closed, there is in essence completed a direct circuit from the input 11 to the gate of a field effect transistor Q3.

Biasing for the diodes of bridge 52 which normally places it in a cutoff or back biased state is provided by Q1 and Q2 and associated resistors. Q1 and Q2 act as current sources having basically infinite impedance. A voltage of approximately 1 volt is developed across R7 and R8. This voltage may be analogized to a battery that floats at the junction of resistor R11 and R12, which are series connected to the gate input of Q3, and the potentiometer R8. This voltage will balance out between itself; half of the voltage, or +.5 volts, will be coupled through R4 to the junction of CR1 and CR3 and −.5 volts will be coupled through resistor R5 to the junction of diodes CR2 and CR4.

A sampling pulse on line 28 is attenuated by series resistor R1 and resistor R2 which is parallel connected to ground. Series connected capacitors C1 and C2 are coupled to respective windings of transformer T1. The input sampling pulse is propagated through the transformers T1 and T2 which form an equivalent transmission line. Upon reaching T2 the balanced sampling pulses, which are of opposite polarity to the bias, will turn on or close bridge 52. Because the bridge is not a good resistive load or termination, reflections may occur which will be terminated and absorbed by R4 and R5; capacitor C5 supplies an AC ground between R4 and R5.

C33 and C4 of bias circuit 54 are bypassed capacitors to filter high frequency ripple from the power supply. Q1 and Q2 act as current sources. However, the network of, for example, Q1, C3, R32 and R3 could be replaced satisfactorily by a resistor up to some positive voltage; the resistor would be large compared to the R7, R8 combination. Likewise Q2 and its associated circuit could be replaced in some application by a large resistor. In addition a field effect type current source might also be used.

Continuing with the operation of the circuit, after the input sampling pulse is propagated to gate 52 the diodes are biased to conductive condition and the resultant impedance of the bridge is an effective low resistance path across it. The incoming sampled voltage from input 11, in addition to activating the gate of the field effect transistor Q3, stores charge in the stray capacitance 56 which appears at the gate input of Q3.

Q3, as the input stage of the voltage to current converter 53 is strictly used as a source follower; the drain is well decoupled. Its source is AC coupled through a capacitor C7 to the base of a transistor Q4. Q4 includes a resistor capacitor network R16 and C8 which are series connected to the ground and coupled to the emitter which sets the AC gain of the stage. R14 and R17 provide DC bias for the base of Q4. In an on condition the potentiometer R16 coupled to the emitter Q4 will supply current proportional to the voltage across it. This current source in some applications might be replaced by a large resistor terminated at a high voltage. The series connected diode CR5 between the collectors of Q5 and Q4 provides a bias or threshold voltage for diodes CR6 and CR7 which are connected between opposite terminals of CR5 and the base of Q7.

The operation of circuit up to this point is as follows: Upon the reception of a sampling gate pulse from input 28, a test signal is sampled causing Q3 to have a voltage transition at its gate. This is the same voltage transition as will occur at its source which however, is at a much lower impedance than the gate. This voltage will be coupled through C7 as a step function with a exponential decay to the base of Q4. The emitter of Q4, being coupled to ground through potentiometer R16 and the capacitors C8, has an AC impedance between ground which is variable between 0 and 50 ohms. If the base of Q4 has a 10 millivolt pulse step and potentiometer R16 is set to 10 ohms the instantaneous current through the transistor Q4, resistor R16, and capacitor C8 will be 1 milliampere. This could be positive or negative depending on the original direction of change of the input sample voltage on terminal 11a, b.

Potentiometer R16 coupled to the emitter of Q4 provides adjustment for compensating for the efficiency of the diode bridge or gate circuit 52 and the subsequent integrator switch 57, and variations in the characteristics of the miller integrator circuit 58. In addition potentiometer R16 picks up any tolerances in the integrator switch pulse width. The collectors of Q4 and Q5 are coupled, as discussed above, to integrator switch 57. More specifically, the collector of Q4 is coupled directly to the collector of transistor Q6 and the collector of Q5 to the same point through a series connected capacitor C9. Diodes CR6 and CR7 are placed across capacitor C9 in opposed polarity senses and their junction is then coupled to the gate input of field effect transistor Q7 which is part of the miller integrator circuit 58. Transistor Q6 functions in a bilateral manner. The transistor is selected so that it has some inverse gain and thus in theory the emitter and collector connections of the transistor can be interchanged and still achieve gain in both modes. Although the inverse gain is substantially less than the normal gain it is sufficient for the purposes of the present invention.

The junction of diodes CR5, CR7, and the collector of Q6 is normally grounded by the integrator gate signal which is normally positive and goes negative during the sampling period for approximately 500 nanoseconds. This positive voltage keeps Q6 in conduction and in this condition the junction is at ground potential since the transistor is saturated. Because of the bilateral characteristic of the transistor Q6, variation of voltage on its collector due to Q4 will not place it in an on condition even if the collector tends to be more negative than its emitter since the input base voltage will still cause the collector to be clamped to ground. When an integrator gate pulse is applied and Q6 is turned off, the collector of Q4 can either go positive or negative depending on the error pulse current from the collector of Q4. Error current is of course produced by change in the amplitude of the sample voltage from the previous amplitude that was stored in stray capacitance 56. The error current normally flows through R16 and C8 of the Q4 circuitry. If there is zero error current then Q4 stays at substantially ground potential. However, if there is a positive input error voltage to Q3 causing positive error current, this will tend to pull the collector voltage of Q4 from ground somewhat negative. On the other hand a negative error voltage and results and current at Q4 tends to turn it off and the current source Q5 and associated components will tend to pull the voltage at the collector of Q4 positive. However, this does not actually occur since there is no resistor across which voltage can be developed and in actuality the miller capacitor C11 coupled to the input gate of Q7 is a source or sink for this positive or negative current. In this manner the miller capacitor voltage across C11 reflects the input error voltage. Thus, in conclusion current either of one polarity or the other polarity flows through diode CR6 or CR7 to the gate of field effect transistor Q7 and integrating capacitor C11, depending on whether the sample input test sample is increasing or decreasing.

Miller integrator field effect transistor Q7 has as auxiliary circuitry temperature compensating effect transistors Q8 and Q9 with their sources coupled together to a negative voltage supply. Potentiometer R32 coupled to the gate input of Q8 eliminates any difference in bias voltages between the two field effect transistors dispensing with the need for matching. Resistor R20 and capacitor C13 in the drain of Q8 are for the purpose of bypassing the power supply. Field effect transistor Q10 coupled to the drain of Q7 and its associated resistor R29 act as a simple current source for the drain of Q7. In essence the current source is like an infinite resistor so that the gain of the circuit is high. Q9 is an emitter follower with its collector bypassed by capacitor C14 immunizing it from transients in the power supply. The base of the transistor sets at an quiescent point of approximately 10 volts because of the 10 volt Zener diode CR9 in its emitter circuit. The Zener diode is used to drop the voltage down to ground since during normal operation transistor Q7 requires some voltage on its drain.

Appropriate values of resistance in ohms and capacitance in microfarad are indicated on the components of FIG. 5.

The waveforms of FIG. 6 illustrates the operation of the probe of FIG. 5. Referring to FIG. 6A an input test signal terminal 11a, b is shown in real time, $t_1$, and its time duration would be of the order 2 nanoseconds. The reconstructed signal, FIG. 6H, has a time base, $t_2$, much greater than $t_1$ which may be several hundred milliseconds. FIG. 6B–F illustrate the progressive sampling pulses. Time intervals between sampling pulses can be as short as 10 microseconds or as long as 10 milliseconds. FIG. 6G illustrates the input error voltage to the voltage to current converter 53 and more specifically to the gate of Q3 and the capacitance 56. The sampled amplitude, charges the capacitance 56 up to its peak point and it decays gradually until the next sample. But because of the previous sample already having charged capacitance 56, only a difference in the test sample, namely $V_1-V_5$, is reflected in FIG. 6G. The length of the integrator gate pulse 29a is illustrated on FIG. 6G as 500 nanoseconds which is a small portion of the time between samples. A change in sampled voltage is transferred to the miller integrator which as shown in FIG. 6H produces a stair step output voltage which reflects the most recently sampled amplitude. However, because of the multiplicity of samples the dashed line running through the stair step is the effective reconstructed input test signal.

Referring now to FIG. 1 the over-all operation of the system of the present invention is timed by sample time controller 26 which controls the time at which samples are made. The main function of sampling pulse generator 27 is the generation of two pulses; a wider pulse 29a (integrator gate pulse), and a narrower pulse 28a (sampling pulse). These are, as described above, are coupled to the individual probes 11. Input 11a and b of the probes extend to the terminals of the device under test. With a multiplicity of probes many points on a device under test can be monitored without mechanically moving the probes around which is time consuming, slow and very unsatisfactory in the testing procedure. Thus, if there are enough probes, all of the points of interest on the device to be tested can be automatically and easily sampled. All of the switching and activation of the probes is accomplished by switching device 33 which connects sampling pulses 28a to a particular active probe. In the preferred embodiment of the invention, there must be two active probes at any one time and there must not be more than two; otherwise reflections will occur on the sampling pulse cables 28 since they are relatively wide bandwidth. The same problem does not exist with the lines 29 since the integrator gate pulse 29a is of a relatively narrow bandwidth.

Switch 39 takes the reconstructed waveform from the probes and switches this reconstructed waveform to either channel A or channel B of the digital waveform analyzer 41. One of active probes is selected as A channel and the other probe as B channel. The actual switches 39 may be either IBM type relay or plug in reed relays on a printed circuit card, which are satisfactory for this type of switching since frequency components in the output waveforms are in the 1 megahertz range. Probe selection driver 34 which controls the switching of the sampling pulse to the probes and the reconstructed output waveform can be controlled remotely from programming medium such as magnetic tape, paper tape, cards, a magnetic drum, relays, a computer or anything which produces digital information. Alternatively front panel switches 36 can be used to program it.

But most importantly the remote digital programmer 37 is a system tool that allows testing to proceed on the order of 200 different probe combinations per second. This is one to two orders of magnitude faster than present systems can operate. The front panel controls are valuable for initially setting up the test routine. In programming the system originally this is a slower process and depends on what type of component is to be tested and the skill of the operator in setting in the proper conditions. But once the program is set up the high testing speed rate can be then used.

In summary therefore, the present invention provides a sampling system and apparatus for testing electronic components which has very high testing rates since only relatively low frequencies are being switched. The system has improved bandwidth capability and is relatively inexpensive. Finally, because of special construction of the probes in the use of current sources and miller integrators, there is relative freedom from saturation effects thereby providing for a greater dynamic range.

We claim:

1. In a sampling system for testing electronic devices having input and output terminals, a test pulse generator for supplying a test signal, pulse generating means for supplying two types of pulses, means for applying the test signal to an input terminal of the device, a plurality of self-contained probes coupled electrically to at least one of the terminals of the device, each of said probes having input coupling means for coupling the probe to one of said device terminals, additional input coupling means for receiving said two types of pulses including single ended means for receiving said one type of pulses and an output terminal, each of said probes including gate means having an input and an output with the input of the gate means connected to the device through said input terminal of said probe and receiving a test signal from the device under test, charge storage means included in said probe and coupled to said output of said gate means, one type of said pulses said pulse generating means being applied to said gate means by said additional coupling means and serving to open and close the gate means to repeatedly charge said storage means to a voltage magnitude corresponding to the voltage magnitude of the test signal, means included in said probe and connected to the storage means without permanently discharging the same for providing a current representing the voltage magnitude, means included in said probe responsive to the other type of said pulses from said pulse generating means for integrating the current to provide at the output of the probe a signal which is reconstruction of the test signal on an increased time base, and means for switching said one type of pulses from said pulse generating means between said single ended receiving means of said plurality of probes.

2. A sampling system as in claim 1 including probe selection driver means for activating said switching means for coupling two predetermined probes to said pulse generating means.

3. A sampling system as in claim 1 in which said one type of said pulses from said pulse generating means are relatively narrow for opening said gate means only during the duration of said pulse and said other type of said pulses from said pulse generating means are relatively wide to provide for integration.

4. A sampling system as in claim 1 in which the coupling between a probe and electronic device is of relatively low capacitance.

5. A sampling system as in claim 1 in which said storage means is charged or discharged in response to whether the voltage magnitude of the test signal is increasing or decreasing.

6. In a self-contained probe for use in a sampling system for sampling test signal waveforms from an electronic device with the use of pulse generating means supplying two types of pulses, one of a relatively narrow width and one of relatively wide width, said narrow width pulses being of a single predetermined polarity, a probe housing having a configuration to permit it to be disposed in close proximity to another probe housing, input coupling means carried by the housing for coupling the probe to a device to be tested, additional input coupling means carried by the housing for receiving said two types of pulses including single ended means for receiving said narrow pulses, storage means within said housing, gate means disposed within said housing and connected to the additional input coupling means which are responsive to said narrow type of pulse for applying a test signal from said electronic device to said storage means during the on time of said narrow pulse, said storage means being charged to a voltage magnitude corresponding to the voltage magnitude of said signal, means connected to the storage means for sensing the voltage magnitude stored in the storage means and providing a current representing the voltage magnitude, and means responsive to the wide type pulse from said pulse generating means for integrating the current to provide at the output of the probe a signal which is a reconstruction of the test signal on an increased time base.

References Cited

UNITED STATES PATENTS

| | | | |
|---|---|---|---|
| 3,172,039 | 3/1965 | Bernstein | 324—73 |
| 3,229,212 | 1/1966 | Rogerse | 328—15 |
| 3,244,989 | 4/1966 | Carlson | 328—151 XR |
| 2,417,062 | 3/1947 | Cooke | 33—174 |
| 3,363,179 | 1/1968 | McCutcheon | 324—72.5 X |
| 3,418,573 | 12/1968 | Alford et al. | 324—73 |

EDWARD E. KUBASIEWICZ, Primary Examiner

U.S. Cl. X.R.

328—15, 151